United States Patent [19]
Gant et al.

[11] 3,746,861
[45] July 17, 1973

[54] METHODS AND APPARATUS FOR MONITORING SIMULTANEOUSLY TWO ENERGY LEVELS OF RADIOACTIVITY IN A GAS

[75] Inventors: Preston L. Gant; Bill G. Motes, both of Ponca City, Okla.; Robert S. Brundage, Las Vegas, Nev.

[73] Assignee: Continental Oil Company, Ponca City, Okla.

[22] Filed: Dec. 23, 1970

[21] Appl. No.: 100,995

[52] U.S. Cl. .............................. 250/380, 250/385
[51] Int. Cl. ............................. G01t 1/18, H01j 39/28
[58] Field of Search ............ 250/43.5 R, 44, 71.5 R, 250/83.3 R, 83.6 R, 43.5 MR, 83.6 FT

[56] References Cited
UNITED STATES PATENTS

| | | | |
|---|---|---|---|
| 3,114,835 | 12/1963 | Packard | 250/71.5 |
| 3,388,254 | 6/1968 | Haller et al. | 250/83.3 |
| 3,320,419 | 5/1967 | Thomas et al. | 250/71.5 R |
| 2,910,592 | 10/1959 | Armistead | 250/71.5 |
| 3,510,654 | 5/1970 | Paap et al. | 250/71.5 R |
| 3,585,388 | 6/1971 | Laney | 250/71.5 R |

*Primary Examiner*—Stanley D. Miller, Jr.
*Attorney*—David Paul Cullen, William A. Mikesell, Jr., Robert B. Coleman, Jr., Henry H. Huth and Joseph C. Kotarski

[57] ABSTRACT

Method and apparatus for detecting, distinguishing and indicating low-level activity of radioactive gases, such as tritium and/or krypton-85, in a selected gas, even in the presence of electronegative gases. The apparatus consists of a detection chamber of a type which is energy selective through inclusion of plural ionization collector circuits providing two separate detector outputs. The two detector outputs are applied then to parallel signal processing channels which serve to separate detected energy through pulse amplitude discrimination and/or coincidence selection to determine absolute quantities of radioactive events for selected contaminants in the gas sample.

10 Claims, 4 Drawing Figures

INVENTORS
ROBERT S. BRUNDAGE
PRESTON L. GANT
BILL G. MOTES

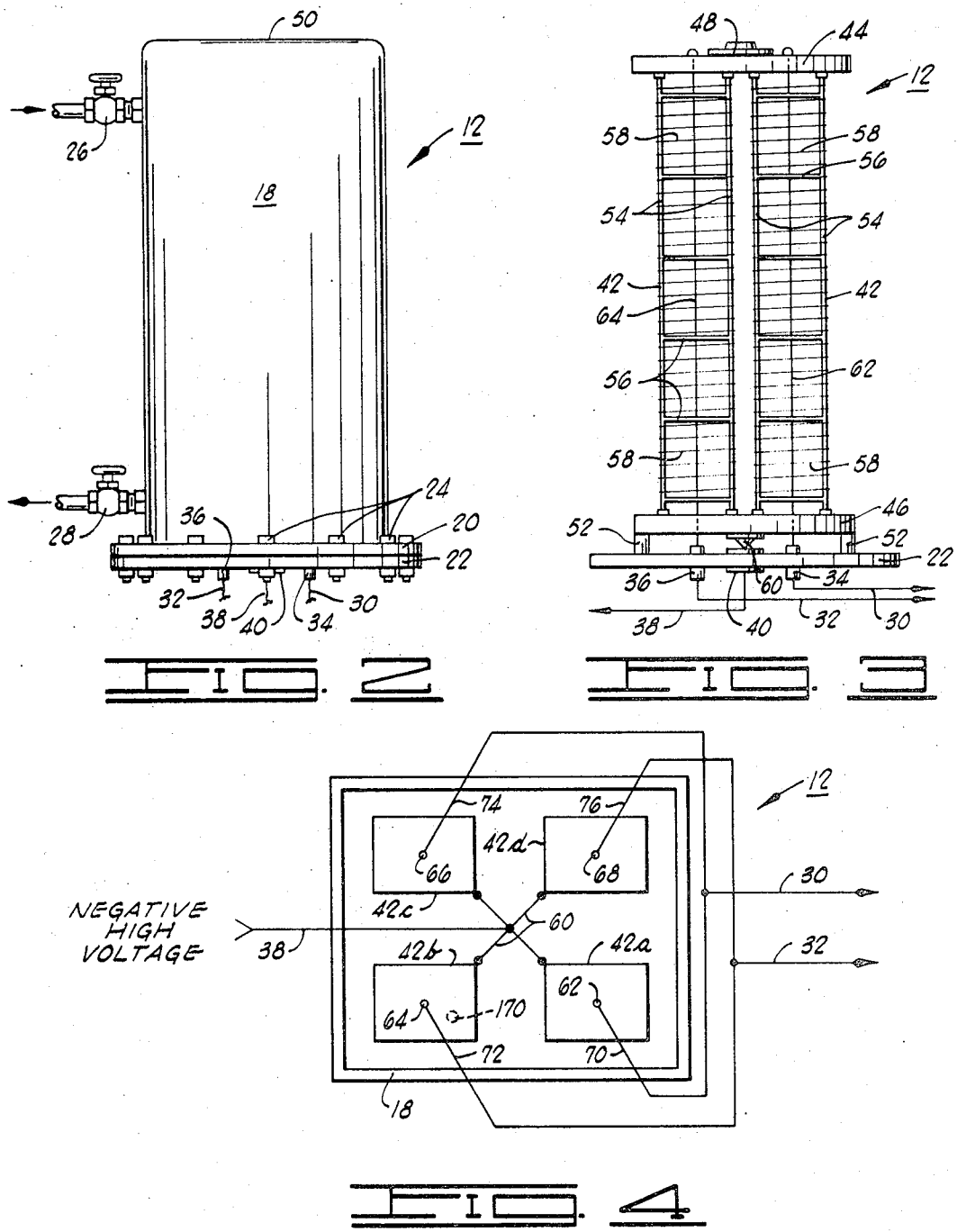

METHODS AND APPARATUS FOR MONITORING SIMULTANEOUSLY TWO ENERGY LEVELS OF RADIOACTIVITY IN A GAS

BACKGROUND OF THE INVENTION

1. Field of the Invention

The invention relates generally to low-level radiation monitoring systems and, more particularly, but not by way of limitation, it relates to improved detection and indication methods and apparatus for monitoring plural, different, radioactive emissions in a selected gas sample.

It is an important aim of the invention to analyze a sample of gas such as methane from an underground cavern formed by a nuclear detonation, for the purpose of detecting and registering the concentration of tritium and krypton-85 activity.

A major difficulty in attempting to derive useful energy values for tritium/krypton-85 values has been the fact that radioactivity measurements of these elements in the presence of electronegative gases is quite inefficient. That is, certain gases which exhibit electronegativity tend to reduce the efficiency and reliability of output results from ionization detection chambers. Many gases occurring in a nuclear chamber exhibit electronegativity in varying degrees; for example, while methane itself is not electronegative, such explosion residues as oxygen, chlorine, carbon monoxide and others are electronegative to an appreciable extent. Since these residual gases may be present in gases drawn from cavities formed by nuclear explosions, accurate and dependable ionization examination of gases from such cavities is particularly troublesome.

2. Description of the Prior Art

The prior art includes various types of apparatus for detecting radioactive events for the purpose of determining the radioactive state of material or environs. Such previous types of measuring devices may be considered to consist of two parts, a detector and a measuring apparatus associated therewith; and there are many different types and combinations of instrument of the general type. Nuclear radiation detectors depend for operation upon either ionization as produced by passage of charged particles and photons to be detected, or by radiation from electrons and nuclei which they excite by interaction. Such detector types include ionization chambers, scintillation counters, geiger-mueller counters, semiconductor-radiation detectors, scintillation crystals and still other forms of detectors such as cloud chambers and photographic plates which are less adaptive to utilization of electronic circuitry. Also, there are many forms of signal processing circuits utilized with selected detectors to perform coincidence counting, proportional counting, pulse height analysis and various signal output functions. However, the inventors are not aware of any prior teachings wherein coincidence detection with ionization devices is successfully utilized to derive specific low-level radioactivity data relative to selected radioactive gases in the presence of electronegative gases.

SUMMARY OF THE INVENTION

The present invention contemplates a method for measuring radioactivity of plural, different gases in a natural gas sample which may include electronegative gas products. The method utilizes a radioactivity detection chamber having plural detection outputs, which is used in combination with circuitry which analyzes the outputs from the chamber as to energy and quantity to measure the radioactivity of two or more isotopes in the mixed gas sample. In a more limited aspect, the invention comprises a combination of elements which includes a detection chamber having associated therewith a plurality of ionization detection circuits coupled in predetermined manner as between first and second detection outputs. The first and second detection outputs are then applied to respective signal processing channels, each of which includes pulse height analyzing means in series with single channel analyzing means to derive low or high emission energy outputs from the pulse height analyzing means. Thereafter, low energy outputs from each channel are futher examined for coincidence to verify as to the probability of the energy of the event pulse.

An especially suitable detection chamber for practice of the present invention has been developed by F. E. Armstrong of the U.S. Bureau of Mines at Bartlesville, Oklahoma. This chamber is shown in FIGS. 2–4 hereof.

It is an object of the present invention to provide a system of electronic circuitry for use with a proportional counter device to detect specific forms of low-level radioactivity.

It is also an object of the invention to provide a system for measuring the radioactivity of tritium and krypton-85 in a natural gas sample which may also include gases of chemical electronegative character.

Finally, it is an object of the present invention to provide apparatus for detection of low-level tritium activity in the presence of krypton-85 activity and to register both radioactivity measurements in absolute concentration.

Other objects and advantages of the invention will be evident from the following detailed description when read in conjunction with the accompanying drawings which illustrate the invention.

BRIEF DESCRIPTION OF THE DRAWINGS

FIG. 2 is a side elevation of a detection chamber as utilized in the invention;

FIG. 3 is an elevation of a detection chamber as shown in FIG. 1 with the chamber housing removed; and FIG. 4 is a schematic illustration of a detection chamber of the general type shown in FIGS. 2 and 3.

DETAILED DESCRIPTION OF THE INVENTION

Figure 1:
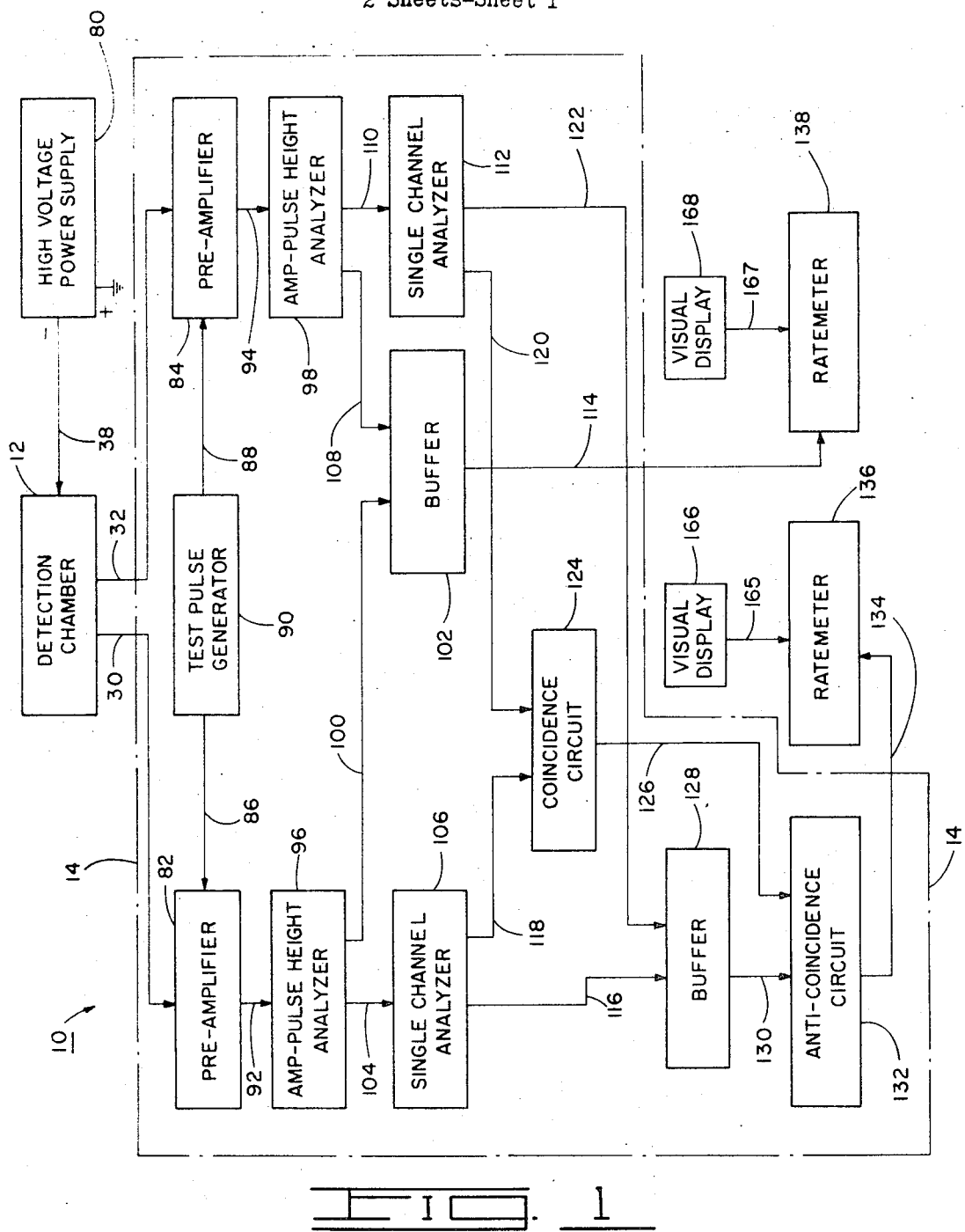
FIG. 1 is a block diagram of radioactivity detection apparatus constructed in accordance to the teaching of the prior art which forms one element of the present invention.

A test system 10, as shown in FIG. 1, utilizes a detection chamber 12 and analyzing circuitry 14 to derive electrical indications of the number of radioactive disintegration events which occur within pre-determined energy bounds. Outputs derived from analyzer circuits 14 are then processed through further scaling and counting circuitry for the purpose of deriving meaningful output indications, as will be further described below.

The detection chamber 12 is preferably a proportional-type counter detector of known type which is capable of providing output electrical signals which may be analyzed for coincidence and amplitude. There are various types of proportional counter chambers which may be utilized as detection chamber 12; however, one form which has proven to operate to good advantage is the chamber as illustrated in elevation in FIGS. 2 and 3 and shown schematically in cross-section in FIG. 4. When this device is used, chamber 12 may consist of a cylindrical housing 18 having a lower flange plate 20 which is fixed to a base plate 22 by conventional fasteners 24 in a gas-tight seal. A gas input valve 26 is secured to an upper portion of housing 18 while a corresponding output valve 28 is carried by the lower portion of the housing. A pair of detector output leads 30 and 32 are disposed in parallel through insulative feed-through elements 34 and 36, respectively; and a high voltage lead 38 is led through a suitable feed-through connector 40.

Referring now to FIG. 3, the interior elements of detection chamber 12 may be seen to include a plurality of electrical potential barriers 42 securely affixed between an upper insulator panel 44 and a lower insulator panel 46. FIG. 3 shows two adjacent electrical potential barriers 42, while actually there are two more potential barriers 42 disposed immediately therebehind (see FIG. 4), such that there are four quadrature-arrayed electrical potential barriers 42a–d disposed within chamber housing 18. It should be understood that there may be still a greater number of electrical potential barriers 42 disposed within the chamber housing 18 in diverse geometrical array.

The upper insulator panel 44 includes an insulative element 48 securely affixed in the center thereof to provide a positioning buffer to be brought against the underside of the upper cylindrical end 50 of chamber housing 18. The lower insulator panel 46 is secured atop a plurality of insulative mounting posts 52 which are securely affixed to base plate 22. Each of the electrical potential barriers 42 consists of an elongated frame in the shape of a right parallelepiped as formed by frame elements 54 and a plurality of transverse elements 56. In addition, each potential barrier 42 also includes a fine wire, on the order of 36 gauge, which is wrapped spirally around each array of four frame elements 42 with secure contact as by welding or soldering being made at each fourth metal-to-metal joinder.

Centrally located, axially extending anodes 62, 64, 66, and 68 rest upon plate 46 and extend into the interior of each of the potential barriers 42a–d, respectively.

Each of the electrical potential barriers 42a–d (FIG. 4); i.e., frame elements 54 as well as transverse elements 56 and barrier wire 58 of FIG. 3, are maintained at a relatively high negative potential; i.e., above 3,000 V, by voltage from parallel leads 60 which are electrically connected through plate 46 to high voltage lead 38. Similarly, voltage on anodes 62, 64, 66, and 68 (FIG. 4) is maintained at relative positive (local DC ground) potential through return connections 70, 72, 74, and 76, respectively. Diagonally opposed return connections 70 and 74 are combined for connection to detector output lead 30, while remaining connections 72 and 76 connect to detector output lead 32.

Referring again to FIG. 1, the detection chamber 12 receives negative high voltage input via high voltage lead 38 from a suitable high voltage power supply 80. High voltage power supply 80 may be selected from various commercially available units; but one assembly which has proven to operate to good advantage is the Model 408B available from John Fluke Manufacturing Company, Inc., of Seattle, Washington.

The detector output leads 30 and 32 from detection chamber 12 are applied as inputs to each of respective pre-amplifiers 82 and 84, each being a commercially available type of pre-amplifier unit. Suitable circuitry for use as pre-amplifiers 82 and 84 is commercially available as Model 109–PC from Ortec, Inc., of Oak Ridge, Tennessee. This is a standard form of pre-amplifier unit which provides for, not only detector lead inputs 30 and 32, but also for additional test inputs as applied via leads 86 and 88 from a test pulse generator 90. The test pulse generator constitutes a source of reference pulse voltage which can be programmed for either simultaneous or separate application via leads 86 and 88 to check both channels of the circuitry.

The outputs of each of pre-amplifier 82 and 84 are then applied via leads 92 and 94 as input to respective amplifier-pulse height analyzers 96 and 98. The amplifier-pulse height analyzers 96 and 98 are identical circuits which consist of an amplifier stage that provides a first pulse height analyzer output as well as a second straight-through amplification output, as will be further described. Such circuitry may be selected from any of various well-known commercially available types; e.g., the Model 486 circuitry from Ortec, Inc., of Oak Ridge, Tennessee.

Analyzer 96 provides a logic pulse output on a pulse lead 100 whenever a high energy pulse is present (in this case most probably an indication of a krypton-85 disintegration event), the pulse output on pulse lead 100 being applied at the input to a buffer 102. An output lead 104 from analyzer 96 carries amplified signals of both high and low energy pulses (tritium, krypton-85 and cosmic energy events) for input to a single channel analyzer stage 106. Similarly, the parallel channel amplifier-pulse height analyzer 98 provides a logic pulse on lead 108 in the event of an incoming pulse of relatively high energy such as might indicate a krypton-85 event in chamber 12. This pulse is applied as input to buffer 102. Similarly, pulse signals of both high and low energy events in chamber 12 are impressed by analyzer 98 on a lead 110 for input to a single channel analyzer 112.

The buffer stage 102 consists of a conventional passive summing circuit which also provides isolation from prior circuitry. The signal output from buffer 102 is fed through an output lead 114 to indicating or display devices to give a representation of high energy related logic signals indicative of krypton-85 activity as will be further described below. The single channel analyzers 106 and 112 may each consist of a stage of commercially available circuitry such as the Ortec Model 406A Analyzer Circuit. In function, the single channel analyzer 106 receives total signal input via lead 104 and functions to block signals of high pulse amplitude while generating logic pulses related to low pulse height signals for output on each of output leads 116 and 118, the logic pulses on lead 116 being probably indicative of low-energy tritium events. Similarly, single channel analyzer 112 provides logic pulse output on each of output leads 120 and 122 upon receipt of a pulse from analyzer 98.

The logic pulses on each of parallel leads 118 and 120 (representing apparent tritium and krypton-85 events) are applied as input to a coincidence circuit 124, which provides an output pulse on lead 126 in the event of a coincidence in input signal energy. A suitable form of coincidence circuitry is commercially available as Ortec Model 481 circuitry. The remaining output leads 116 and 122 from respective parallel channel analyzers 106 and 112 are applied as input to a buffer 128, a passive summing circuit of known type, which provides an output on a lead 130 to an anti-coincidence circuit 132. The anti-coincidence circuit receives output from buffer 128 on lead 130 as well as coincidence output on lead 126, to provide an output via lead 134 only when there is not a coincidence of input signal energy via leads 126 and 130. That is, the anti-coincidence circuit 132 will block output on lead 134 if there is simultaneous arrival on leads 130 and 126 of logic signals not related to apparent low energy level tritium activity.

The output on lead 134 from anti-coincidence circuit 132 is applied to a ratemeter 136; e. g., Ortec Model 441, to provide a continuous proportional count of low level energy pulse detection representing apparent tritium activity. A visual display 166, which may be in the form of a sealer or a continuous recording chart, receives information from ratemeter through a conductor 165. Similarly, high level activity, most probably relating to krypton-85 events, is present in pulse form on lead 114 for application to a linear ratemeter 138. Information from this ratemeter is transmitted via lead 167 to a visual display 168 which is similar to display 166.

OPERATION

The operation is described with reference to a test system wherein detection chamber 12 is constructed as shown in FIGS. 2, 3, and 4. In chamber 12, each of the potential barriers 42a through d functions with its respective anode 62, 64, 66, and 68 to provide a pulse output on the associated one of output leads 30 and 32 in response to a beta emission which causes ionization within the potential barriers 42a through d. Pulse output is derived on each of anode output leads 70 through 76 in response to beta emission within its respective potential barrier 42a through d; and the amplitude of such pulse outputs is dependent on the emission energy of the beta particle thereby to identify with high probability its emitting source; i.e., either a tritium or a krypton-85 beta emission.

The maximum energy of a tritium beta emission is approximately 18 kiloelectrovolts, with a most probable energy value of about one-third of this figure, or 6 kiloelectrovolts. Similarly, the maximum energy of a krypton-85 beta emission is approximately 670 kiloelectrovolts, the most probable value being approximately 225 kiloelectrovolts. Thus, it will be seen that there is a wide variance between the relatively low energy tritium beta emission value and that of krypton. Distinction is enabled in signal processing by compounding the beta emission sense outputs of diagonally opposed ones of the potential barriers 42a through d. Thus, a high energy emission is distinctly more probable of appearing through each of two adjacent potential barriers than is a relatively low energy beta emission and, as will be further described below, this factor is utilized as one of the identifying functions in the measuring process. Also, in addition to the expected ionizations from tritium and krypton-85 beta emissions, there is also cosmic radiation of varying energies which must be taken into account in a final tally.

By way of illustration through consideration of a single event, the following speculates on what takes place when a tritium event occurs at a position 170 within potential barrier 42b of chamber 12 (FIG. 4) with the beta trajectory in the direction of potential barrier 42a. Since the energy of the tritium beta is relatively low, it will be absorbed within potential barrier 42b before reaching the sensitive volume within potential barrier 42a (connected to the opposite output lead 30) so that there will be a detected pulse impressed on output lead 32, but no corresponding signal on adjacent conductors leading to output lead 30. On the other hand, if the event at area 170 were a krypton-85 event, there is a significant probability that this would result in a pulse not only on output lead 32, but also on output lead 30 due to what in all probability is a higher energy emission from the krypton-85 beta decay. If, however, the beta particle from a krypton-85 event were to be expelled in a direction away from potential barriers 42a and 42c (diagonally coupled barriers), there would result only a single pulse on output lead 32 as was the case with the tritium event; but, due to the relatively high energy of the krypton-85 event, the peak height of the output pulse would generally be significantly higher than would the peak height for a tritium event.

A similar phenomenon would occur when cosmic ray energy traverses the inside of chamber 12. Since the rays are ordinarily of high energy, the probability would be that any cosmic ray entering chamber 16 would result in a pulse in both of the output leads 30 and 32. However, because of the geometry of the system, it is still possible that a cosmic ray might pass through only a corner of one of the enclosures, thereby resulting in a pulse in only one of the output leads 30 or 32.

To summarize, it may be seen that for a tritium event there will ordinarily be a single pulse on either one of output leads 30 or 32, but not on both of the output leads unless essentially simultaneous tritium events take place in adjacent enclosures. Such occurrence is highly and predictably improbable. Unless absorbed energy from a krypton-85 event is low, or is deposited only in one pair of diagonally opposed potential barriers 42, there will appear an output pulse on both of output leads 30 and 32. Moreover, because of what is ordinarily the greater energy of a krypton-85 event, the pulse height resulting from such an event will generally be significantly higher than the pulse height from a tritium event.

In addition to signals from tritium and krypton-85 in the system, cosmic radiation will likewise cause detection signals which generally will appear on both of output leads 30 and 32, but which may occasionally appear only on one or the other of output leads 30 or 32. The activity detected due to cosmic events will be essentially constant except for statistical fluctuations and variations due to altitude of use of the measuring instruments.

Referring again to FIG. 1, output signals from leads 30 and 32 are applied to respective pre-amplifiers 82 and 84 for amplification, whereupon the outputs are applied to respective amplifier-pulse height analyzers 96 and 98. The amplifier-pulse height analyzers 96 and 98 each function to amplify the total signal and to pass it on to respective single channel analyzers 106 and 112, and also to generate logic pulse outputs related to high energy krypton-85 events for application into a buffer 102. The output from buffer 102 is then applied via lead 114 to the linear ratemeter 138 and subsequently to display 168, which provides suitable output indication of the high energy or krypton-85 beta emissions.

The total signal outputs to single channel analyzers 106 and 112 are processed therein to block signals having pulse height greater than a pre-set amount, and to generate logic pulses related to low pulse height signals for output on each of respective leads 116 and 122, as well as logic pulses related to all input pulses greater than a selected energy for output on respective leads 118 and 120. A first pair of output leads 118 and 120 apply opposite-channel logic pulses to coincidence circuit 124, which provides an output via lead 126 only when there is simultaneity of the two input pulses. A remaining pair of output leads 116 and 122 then apply the low pulse height logic pulses to a buffer 128, which provides output 130 to an anti-coincidence circuit 132. The anti-coincidence circuit 132 provides an output only when there is non-simultaneity of arrival of pulses on input leads 126 and 130.

In relating the various functions of the circuit elements to the output pulses present on output leads 30 and 32, it should be kept in mind that there may be relatively low energy krypton-85 events within chamber 12 which produce a signal having a relatively low pulse on both of output leads 30 and 32. Moreover, it is possible that certain cosmic ray events may also produce low energy outputs simultaneously on each of output leads 30 and 32. These signals will pass through the single channel analyzer stages 106 and 112 which would normally block krypton-85 signals of high energy, since these low energy events are similar to signals arising from a tritium event. However, since these signals appear on both the opposed channels of circuitry, they will trigger an output pulse from coincidence circuit 124, which is utilized by anti-coincidence circuit 132 to block the corresponding pulse arriving through input lead 130 from buffer 128. Absent such signals from coincidence circuit 124, signals impressed upon anti-coincident circuit 132 will be conducted via output lead 134 through ratemeter 136 for low energy pulse count in display 166.

The high energy related counts at display 168 will contain a record not only of the krypton-85 events but also of high energy cosmic radiation and a small portion of the tritium events. Moreover, low energy related counts of display 166 will include not only tritium events but also low energy krypton-85 events, as well as some cosmic energy events. In order to determine the actual values for the tritium and krypton-85 activity, it is necessary to calibrate the apparatus, to determine an accurate background radiation level, and to determine the high/low energy mix from prior assembled data for relatively pure tritium and krypton-85 samples. Given these values, an algebraic analysis can be made to determine the probable actual level of tritium and krypton-85 radiation in the particular gas sample being processed.

The foregoing discloses a novel method and apparatus for measuring radioactivity emitting nuclides within a natural gas sample. This system utilizes an ionization chamber having plural detection elements in geometrical array to differentiate between energies of radioactive emission in output signals. Processing of the output signals takes place in a manner which utilizes variables in pulse height, pulse coincidence, and lack of pulse coincidence to distinguish between low and high energy radioactive events, and further to distinguish over various energies of background radiation.

Changes may be made in the combination and arrangement of steps as heretofore set forth in the specification and shown in the drawings; it being understood that changes may be made in the embodiments disclosed without departing from the spirit and scope of the invention as defined in the following claims.

What is claimed is:

1. A method of continuously analyzing a sample of gas to ascertain relative amounts of low energy and high energy radioactivity, comprising the steps of:
   deriving first and second electrical outputs from each of first and second juxtaposed ionization chambers adapted for disposition within the environs of said gas;
   processing output electrical signals from either of said first and second electrical outputs to derive first and second logic pulses each indicative of selected relative low energy radioactive events;
   processing said electrical signals from either of said first and second electrical outputs to derive first and second high amplitude pulses indicative of high energy radioactive events;
   further processing said derived first and second logic pulses to determine whether said first and second logic pulses occur coincident in time, and providing a low amplitude pulse output in response to the condition of non-coincidence; and
   counting said first and second high amplitude pulses as well as said low amplitude pulse output to tally the respective high energy and low energy radioactivity indications.

2. A method as set forth in claim 1 which is further characterized in that:
   said gas sample includes electronegative gaseous elements.

3. A method as set forth in claim 1 wherein said steps of further processing said derived first and second logic pulses indicative of said low energy events include:
   applying said first and second logic pulses in parallel for input to coincidence circuitry to provide an output only upon coincidence of input;
   adding said first and second logic pulses to derive a sum logic pulse; and
   applying the output from the coincidence circuitry in parallel with said sum logic pulse for input to anti-coincidence circuitry which provides a low amplitude pulse output.

4. Apparatus in combination with an ionization chamber for determining relative quantities of radioactive contaminants in a gas passing through said chamber, which contaminants have different energies of emission of radioactive particles, said ionization chamber being a type which includes first and second pluralities of electrical charge barriers each cooperating with respective ones of first and second pluralities of collector electrodes, each of said first and second pluralities of electrodes being connected in parallel to a respective first and second collector group output lead, the apparatus comprising:
   first and second circuit means each including pulse height analyzer means and each receiving inputs from said first and second collector group output leads to provide first and second amplified signal outputs as well as respective first and second logic pulse outputs when said inputs fall within pre-set signal amplitudes;

first and second channel analyzer means receiving said respective first and second amplified signal outputs to provide third and fourth logic pulse outputs when said received signals fall within preset signal amplitudes;

first buffer means receiving said first and second logic pulse outputs to provide an output indicative of said radioactive emissions at greater than predetermined energy; and second buffer means receiving said third and fourth logic pulse outputs to provide output indicative of said radioactive emissions at less than said predetermined energy.

5. Apparatus as set forth in claim 4 which is further characterized to include:

coincidence circuit means receiving said third and fourth pulse outputs at the input to provide a coincidence pulse output; and anti-coincidence circuit means receiving said second buffer means output and said coincidence pulse output at respective ones of two inputs to generate a low energy pulse output upon non-coincidence of input pulses which is indicative of low energy level radioactive emissions.

6. Apparatus as set forth in claim 5 which is further characterized to include:

counting means receiving each of said first buffer means output and said anti-coincidence circuit means low energy pulse output to provide a count of both high energy and relatively low energy radioactive emissions in the gas-filled chamber.

7. Apparatus as set forth in claim 6, wherein said gas passing through said chamber is natural gas, including one or more electronegative gases intermixed therein.

8. Apparatus for determining the relative quantities of radioactive contaminants in a natural gas sample that includes some electronegative gas molecules, which contaminants have different effects on the magnitude of charge pulses due to emission of radioactive particles, the apparatus comprising:

chamber means for receiving a quantity of said natural gas therethrough;

a plurality of negatively charged electrical barriers each being closed to form a barrier space, said barrier spaces being disposed in generally equispaced distribution throughout said chamber means;

a plurality of collector electrodes disposed generally centrally within and isolated from respective ones of said electrical barrier spaces;

first and second collector leads each being connected to a respective group of collector electrodes, each group consisting of selected different ones of said collector electrodes;

first circuit means receiving input from said first collector lead to provide amplified first output indicative of radioactive particle emission within the barrier spaces communicating with said first collector lead and connected collector electrodes;

second circuit means receiving input from said second collector lead to provide amplified second output indicative of radioactive particle emission within remaining barrier spaces in communication with said second collector lead and connected collector electrodes;

first and second analyzer means receiving said first and second outputs from respective first and second circuit means to generate first and second high amplitude pulse outputs indicative of relatively high energy radioactive emissions, as well as first and second signal outputs;

first buffer means receiving said first and second logic pulse outputs to provide an output indicative of said radioactive emissions at greater than predetermined energy; and second buffer means receiving said third and fourth logic pulse outputs to provide output indicative of said radioactive emissions at less than said predetermined energy.

9. The apparatus defined in claim 8 which is further characterized to include:

coincidence circuit means receiving said third and fourth pulse outputs at the input to provide a coincidence pulse output; and anti-coincidence circuit means receiving said second buffer means output and said coincidence pulse output at respective ones of two inputs to generate a low energy pulse output upon non-coincidence of input pulses which is indicative of low energy level radioactive emissions.

10. The apparatus defined in claim 9 which is further characterized to include:

counting means receiving each of said first buffer means output and said anti-coincidence circuit means low energy pulse output to provide a count of both high energy and relatively low energy radioactive emissions in the gas-filled chamber.

* * * * *